United States Patent [19]
Carlin et al.

[11] 4,083,403
[45] Apr. 11, 1978

[54] SURFACTANT OIL RECOVERY PROCESS

[75] Inventors: Joseph T. Carlin; Jack H. Park, both of Houston, Tex.

[73] Assignee: Texaco Inc., New York, N.Y.

[21] Appl. No.: 746,644

[22] Filed: Dec. 1, 1976

[51] Int. Cl.$^2$ .................................................. F21B 43/22
[52] U.S. Cl. .................................... 166/252; 166/273; 166/275
[58] Field of Search ................ 166/252, 273, 274, 275

[56] References Cited

U.S. PATENT DOCUMENTS

| | | | |
|---|---|---|---|
| 3,302,713 | 2/1967 | Ahearn et al. | 166/274 |
| 3,467,190 | 9/1969 | Dunlap et al. | 166/274 X |
| 3,468,377 | 9/1969 | Dunlap et al. | 166/274 |
| 3,480,080 | 11/1969 | Murphy | 166/274 X |
| 3,498,379 | 3/1970 | Murphy | 166/274 X |
| 3,623,553 | 11/1971 | Burdge | 166/275 |
| 3,648,770 | 3/1972 | Gogarty | 166/273 |
| 3,799,263 | 3/1974 | Prillieux et al. | 166/275 |
| 3,915,230 | 10/1975 | Flournoy et al. | 166/252 |
| 3,994,342 | 11/1976 | Healy et al. | 166/275 |

*Primary Examiner*—Stephen J. Novosad
*Assistant Examiner*—George A. Suchfield
*Attorney, Agent, or Firm*—Carl G. Ries; Thomas H. Whaley; Jack H. Park

[57] ABSTRACT

Surfactant oil recovery process in which an aqueous fluid containing petroleum sulfonate is injected into an oil formation containing water which is naturally fresh or which has been reduced to an acceptable salinity level by a pre-flush with fresh water is disclosed. Optimum oil recovery is achieved by determining the average equivalent weight petroleum sulfonate which produces the minimum interfacial tension in an oil-brine system similar to that present in the formation in which the surfactant is to be injected, and a petroleum sulfonate sample having an average equivalent weight which is from 2 to 20 percent and preferably from 5 to 15 percent less than the average equivalent weight of the sample which produced the minimum interfacial tension, or from 20 to 100 and preferably from 30 to 70 equivalent weight units less than the average equivalent weight of the sample which produced the minimum interfacial tension is used in the oil recovery process.

8 Claims, 1 Drawing Figure

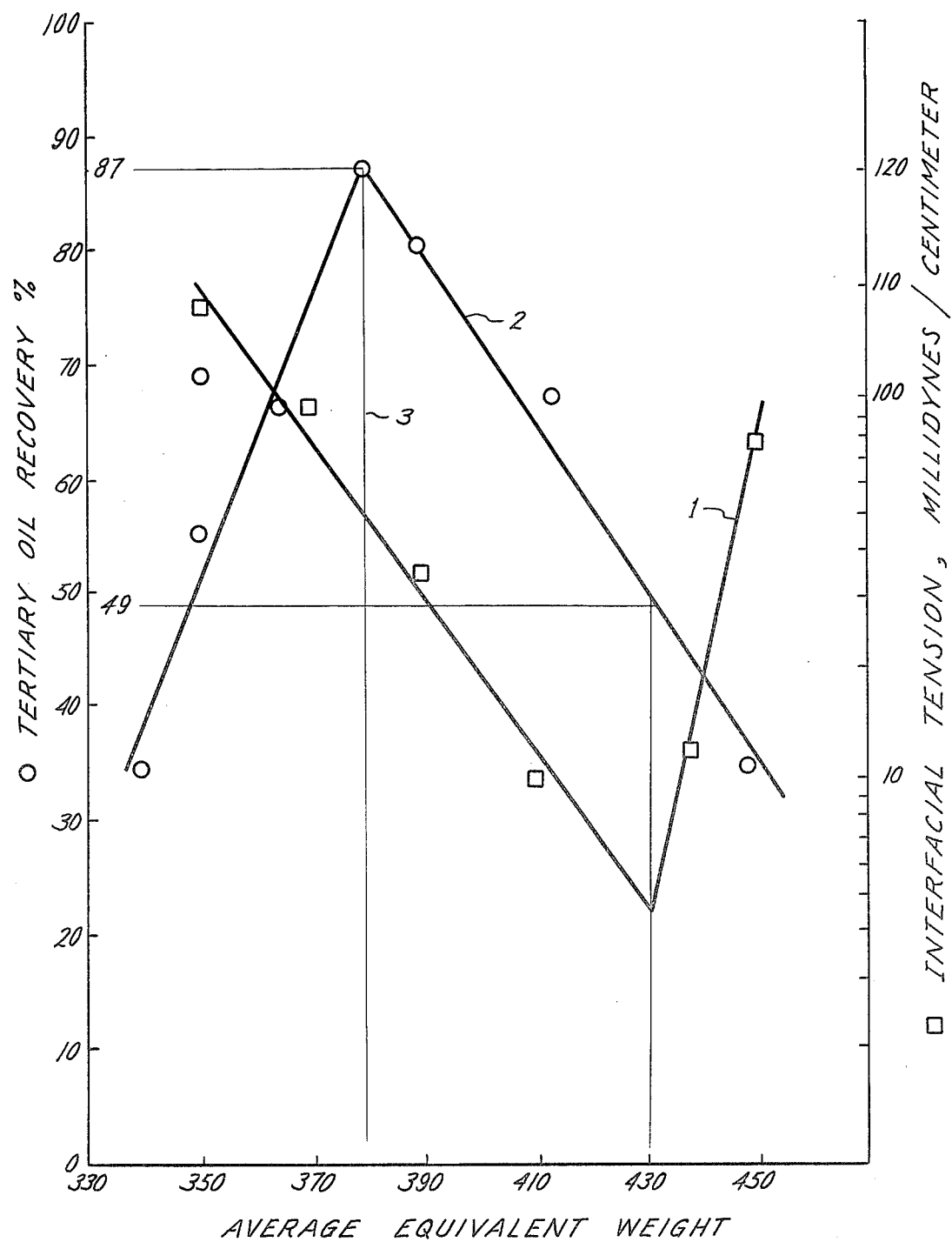

SURFACTANT OIL RECOVERY PROCESS

BACKGROUND OF THE INVENTION

1. Field of the Invention

This invention concerns an enhanced oil recovery process and more specifically a surfactant flooding enhanced oil recovery process. Still more specifically, this invention is concerned with an oil recovery process suitable for use in subterranean formations whose water is naturally fresh, or in formations in which the water salinity can be reduced to a relatively fresh level by preflush treatment, permitting the use of an aqueous fluid containing petroleum sulfonate, the petroleum sulfonate having a preferred average equivalent weight value.

2. Description of the Prior Art

It is well known in the prior art that when a subterranean petroleum formation containing sufficient petroleum and having adequate permeability to permit commercial exploitation thereof is discovered, and primary petroleum recovery is accomplished to the normal commerical termination point and waterflooding is thereafter applied to the formation, only from 30 to 70 percent of the oil normally present in the formation is recovered and significant quantities of petroleum remain in the formation thereafter. Many prior art references teach the use of an enhanced recovery or tertiary recovery program in which an aqueous fluid, which may be a pure solution, or a water external emulsion or an oil external emulsion is injected into the formation to displace and recover additional petroleum from the formation over the obtainable by primary recovery and by waterflooding. Although references are found in the prior art to the use of many surfactants, petroleum sulfonates is still the preferred surfactant for enhanced oil recovery at the present time because of the relatively low cost of petroleum sulfonate as compared to synthetic surfactants. For example, U.S. Pat. No. 3,302,713 teaches the use of a particular petroleum sulfonate prepared from a specific boiling range fraction of petroleum feedstock. It is also taught in the prior art that optimum recovery and surfactant flooding processes using petroleum sulfonate is achieved if the petroleum sulfonate comprises a mixture of at least one petroleum sulfonate which is predominantly water soluble and at least one petroleum sulfonate which is predominantly oil soluble. U.S. Pat. No. 3,434,542 teaches the use of petroleum sulfonate whose median equivalent weight is from 375 to 430, and contains components having equivalent weights in the range of from 290 to 590 with no more than 10% being less than 290 and no more than 15 percent being greater than 590. The surfactant fluid also contains polysaccharides as a viscosifier for mobility control. U.S. Pat. No. 3,468,377 describes an oil recovery process employing about the same petroleum sulfonate in an aqueous fluid which also contains sodium chloride, sodium carbonate and inorganic phosphates. The prior art recognizes generally that the average equivalent weight of the particular petroleum sulfonate utilized influences the ultimate oil recovery efficiency, and implicitly or explicitly relates the oil recovery displacement efficiency to the capability of the particular petroleum sulfonate material utilized in reducing the interfacial tension between the formation petroleum to be recovered and the aqueous fluid, e.g., the formation brine present in the formation at the time the surfactant solution contacts the formation petroleum.

Despite encouraging laboratory results, field use of surfactant flooding techniques has never been entirely satisfactory from a commerical point of view, principally because the value of the additional oil recovered is insufficient to justify the high cost of the surfactant materials injected into the formation.

In view of the present inadequacy of gross domestic productive capability to satisfy our needs for petroleum, it is of paramount importance that surfactant flooding technology be developed which will permit commercial production of the oil remaining in a subterranean petroleum formation after conclusion of conventional primary and secondary recovery operations.

SUMMARY OF THE INVENTION

The present invention concerns a surfactant flooding, enhanced oil recovery process suitable for application to subterranean oil or petroleum-containing formations. It will generally be applied to formations which have already been exploited to the maximum economic limit by conventional primary and secondary, e.g., waterflooding processes. The present invention involves the use of a fluid containing as the sole surfactant or surface active agent, petroleum sulfonate, and is primarily applicable to those formations which, at the time surfactant flooding is to be applied thereto, contain water which is relatively fresh, e.g., whose salinity is less than about 20,000 parts per million total dissolved solids and preferably is less than about 15,000 parts per million total dissolved solids, and which has a divalent ion concentration less than about 1,000 parts per million and preferably less than about 500 parts per million. The formation may naturally contain water in this range or it may be one which can be pretreated by preflushing with an aqueous preflush treatment to reduce the salinity and divalent ion concentration to these levels. The salinity of the aqueous environment into which the surfactant fluid is introduced is essential because petroleum sulfonate becomes insoluble at higher levels of salinity and divalent ion concentration, which will not only render petroleum sulfonate ineffective for reducing interfacial tension and recovering additional oil, but which may additionally cause plugging of the small capillary flow channels in the formation, reducing permeability to a level which will thereafter restrict the use of any type of enhanced oil recovery operation.

We have found that, surprisingly, the average equivalent weight of petroleum sulfonate which results in the maximum oil recovery in a surfactant flooding operation is not precisely the same as the average equivalent weight of petroleum sulfonate which results in the maximum reduction in interfacial tension. We have observed that in surfactant flooding operations in which petroleum sulfonate is essentially the only surfactant utilized in a relatively fresh water environment, although good tertiary oil recovery efficiency is achieved using a petroleum sulfonate sample which produced the minimum interfacial tension between the aqueous environment and the formation petroleum significantly better oil recovery is achieved if the equivalent weight of the petroleum sulfonate injected into the formation is from 2 to 20 and preferably from 5 to 15 percent less than the equivalent weight of the petroleum sulfonate which results in the minimum interfacial tension between the aqueous fluid and the formation petroleum. Stated another way, we have found that the maximum oil recovery is achieved if the equivalent weight of the petroleum sulfonate injected into the formation is from 20 to 100 and preferably from 30 to 70 equivalent weight units less than the equivalent weight of the petroleum sulfonate which produces the minimum interfacial tension between the formation petroleum and the brine or aqueous fluid existing in the formation at the time surfactant flooding is to be applied to the formation. The increment of additional tertiary oil which can be achieved by the slight shift in equivalent weight of petroleum sulfonate sample injected into the formation is quite significant, especially considering that the weight percent and unit cost of materials utilized is not significantly increased as a consequence of this change.

BRIEF DESCRIPTION OF THE DRAWING

The enclosed drawing illustrates graphically the tertiary oil recovery and interfacial tension between formation petroleum and brine from the same field as the formation petroleum was obtained, for a series of petroleum sulfonate samples whose average equivalent weight ranges from about 340 to about 450.

DESCRIPTION OF THE PREFERRED EMBODIMENT

Our invention relates generally to the field of surfactant flooding enhanced oil recovery, which will in general ordinarily comprise the following steps:

A preflush is often required or desirable to adjust the salinity and divalent ion concentration of the water present in the oil formation at the time surfactant flooding is to be applied, in order to bring the salinity and divalent ion concentration of the formation water into the range in which the surfactant to be employed exhibits maximum oil recovery efficiency. Ordinarily, this will require the injection of an aqueous fluid having a salinity and/or divalent ion concentration lower than that present in the oil formation, although occasionally it will be necessary to first increase the salinity and/or divalent ion concentration in extremely fresh water reservoirs prior to injecting the surfactant solution. Ordinarily, petroleum sulfonate exhibits optimum oil recovery effectiveness if the salinity is in the range from about 2,000 to about 20,000 parts per million and if the divalent ion concentration, which is generally calcium and magnesium ions, is in the range from about 0 to about 1,000 parts per million. If the field water present in the formation at the time the surfactant flooding operation is to be initiated, is in this range the salinity and divalent ion-adjusting preflush step may be eliminated from the field process.

If a preflush is to be utilized, other chemicals may be included therein, such as inorganic polyphosphate salts for the purpose of reducing the amount of surfactant adsorbed from the surfactant solution or fluid, etc.

After injection of the preflush and/or other formation conditioning step has been completed, the surfactant fluid is injected. Ordinarily, optimum economics are realized if a relatively dilute aqueous solution of the surfactant to be utilized is injected into the formation. A surfactant solution may also have a minor amount of discontinous, non-aqueous phase associated therewith, such as a water-external emulsion. Frequently this is unavoidable if the petroleum sulfonate contained appreciable amounts of unsulfonated petroleum feed stocks. For the purpose of our invention, it is preferred that no additional petroleum or other materials insoluble in water be added to the surfactant fluid.

Ordinarily, the volume of surfactant fluid utilized will be from 0.05 to about 1.0 pore volumes and preferably from 0.1 to 0.5 pore volumes based on the volume of formation to be swept by the injected fluid, which is generally determinable by known reservoir engineering techniques. The concentration of petroleum sulfonate utilized in the surfactant containing fluid is from about 0.5 to about 10.0 percent by weight. The exact concentration will depend on a number of factors, including the results of laboratory tests indicating what concentration of surfactant produces the optimum oil recovery as well as the amount of surfactant which will be adsorbed from the solution by the formation mineral surfaces or otherwise retained in the formation as the surfactant fluid passes through the formation. Stated another way, the amount of surfactant utilized in the process of our invention will ordinarily be from about 1 to about 3 milligrams of surfactant per cubic centimeter of rock, or from about 2,500 to about 5,500 pounds of surfactant per acre foot of formation to be contacted by the surfactant fluid.

The surfactant fluid should have a salinity and divalent ion concentration as nearly as possible equal to the optimum salinity and divalent ion concentration for the particular surfactant being utilized, and to which the formation will have previously been adjusted by the preflush and other preconditioning steps discussed above.

It is sometimes desirable to vary the concentration of surfactant in the surfactant fluid with time or with volumes of surfactant fluid injected into the reservoir, a procedure referred to in the art of enhanced oil recovery as tapering the surfactant concentration. Increasing or decreasing tapers are sometimes utilized, although ordinarily it is preferred that the concentration of surfactant be tapered in a decreasing fashion in order to compensate for losses in the early portion of surfactant slug injected into the reservoir due to surfactant adsorption onto the formation mineral surfaces or other forms of retention of surfactant in the formation.

Other materials may also be included in the surfactant fluid. Sacrificial agents, or materials which are adsorbed preferentially by the formation mineral surfaces and which thereby prevent adsorption of surfactant from the surfactant fluid, are sometimes included in the surfactant fluid, whether or not such material have been utilized in a preflush, preconditioning step. Similarly, hydrophilic polymeric materials which have the effect of increasing the viscosity of the surfactant fluid to a level greater than its value without the polymeric materials and preferably about equal to or slightly greater than the viscosity at formation conditions of the formation petroleum, in order to increase the displacement efficiency and reduce the tendency for injected fluids to finger through more viscous petroleum, may be incorporated in the surfactant fluid.

State of the art enhanced oil recovery processes ordinarily involve injecting into the formation after completion of the step of injecting surfactant fluid thereinto, a quantity of aqueous fluid containing a viscosity-increasing material, most commonly a hydrophilic polymeric material such as polyacrylamide or polysaccharide. The viscosity of the viscous fluid, commonly referred to as a mobility buffer, should be at least equal to and preferably greater than the viscosity of the surfactant fluid, in order to ensure that the surfactant fluid maintains its discreteness and is displaced efficiently by the viscous fluid. The concentration of viscosity increasing polymer or other substance may similarly be tapered, generally being decreased with time as the fluid is injected into the formation. Ordinarily, from 0.2 to 1.0 pore volumes of the viscous fluid is sufficient, and in the instance of using a hydrophilic polymeric material such as polyacrylamide or polysaccharide, the concentration thereof will ordinarily be from about 100 to about 1,000 parts per million, sufficient to produce a viscosity at formation conditions slightly greater than the viscosity of the formation petroleum at those conditions.

Once the desired quantity of mobility buffer slug has been injected into the formation, waterflooding is resumed to displace the mobility buffer, surfactant fluid, and other injected fluids, together with the petroleum displaced by the surfactant fluid, through the formation.

The essence of our invention is concerned with a method for selecting the petroleum sulfonate to be used in any particular application, based on relatively simple tests that can be performed on samples of field water and formation petroleum from the field in which the surfactant is to be utilized for enhanced oil recovery purposes.

As a minimum condition for the proper performance of the tests to be described hereinbelow, the salinity and divalent ion concentration of the water present in the formation at the time surfactant flooding is to be undertaken, should be determined so a synthetic field brine can be prepared which simulates as nearly as possible the brine actually present in the formation. It is preferred that tests be performed in an actual sample of water produced from the same formation as that into which the surfactant fluid is to be injected, in order to ensure that the conditions are precisely the same as will be encountered in the formation. Similarly a sample of petroleum from the formation into which the surfactant solution is to be injected should also be obtained for the performance of the interfacial tension measurement tests to be described below. Similarly, the formation temperature should be ascertained, and to the extent possible, the tests should be conducted at a temperature about equal to the formation temperature in order to ensure that representative measurements are obtained.

It is desired to obtain or blend samples of petroleum sulfonate in order to have a series of samples whose average equivalent weight vary from about 350 to about 450, preferably with representative samples with at least four and preferably six samples evenly distributed throughout this equivalent weight range including the end points. This can frequently be accomplished by obtaining two samples of substantially different average equivalent weights and blending the materials in order to form the blends for performing the tests to be described hereinafter below.

The precise procedures to be employed can best be understood by referring to the attached FIGURE, in which a number of petroleum sulfonate samples were evaluated. The samples were prepared by blending together various ratios of two materials, both commercially available petroleum sulfonate surfactants, one of which has an average equivalent weight of 330 and the other having an average equivalent weight of 500. By varying the ratio of these two materials, any number of samples can be formulated with equivalent weights between these two values.

In the first series of tests, the interfacial tension was measured using each of the blended sulfonate samples. In each case, a drop of formation petroleum is injected into a solution of surfactant in the actual formation water brine which had a salinity of 5800 parts per million total dissolved solids and a hardness of 54 parts per million divalent ions, essentially all calcium and magnesium and additional sodium chlorides was added to bring the salinity up to 13,000 parts per million. Various percentages of the petroleum sulfonate samples was added to each sample, and the interfacial tension was measured by the Sessile Drop Method at ambient temperatures. Curve 1 represents graphically the variation of interfacial tension derived from this first series of tests expressed as a function of the average equivalent weight of the petroleum sulfonate sample tested. It can be seen that a fairly sharp minimum in the interfacial tension curve was obtained using a sample having an average equivalent weight of about 430. One following the prior art teachings would be led to believe that this sample would be the optimum for use in a surfactant flooding operation involving oil and brine similar to that utilized in the interfacial tension measurements.

A series of core displacement tests were performed, using a sandstone core saturated first with the brine described above and then resaturated with oil to an average saturation of 60 percent, after which it was waterflooded to an average oil saturation of about 30 percent. This was then flooded with a 2.0 percent by weight of each petroleum sulfonate sample in the field brine, and the percent of the tertiary oil remaining after waterflooding which could be recovered by this method was determined. These core displacement tests were repeated for each of the petroleum sulfonate samples investigated, and curve 2 in the attached FIGURE illustrates that a sharp maximum value of oil recovery was observed which corresponded to a core flood performed using a petroleum sulfonate sample having an average equivalent weight of 380.

Examination of the FIGURE illustrates the significant difference in the oil recovery efficiency obtained using the process of our invention as contrasted to that obtainable using the methods taught in the prior art. Prior art teachings which suggest that maximum oil recovery is obtained using the product of formulation which results in the minimum interfacial tension would suggest that one should use the petroleum sulfonate blend having an average equivalent weight of 430. Indeed, one using this particular petroleum sulfonate would recover a significant amount of the oil remaining in the formation after completion of waterflood operations. As can be seen from the graph, surfactant flooding with petroleum sulfonate having an average equivalent weight of 430 resulted in obtaining 49 percent of the tertiary oil present in the core, e.g., 49 percent of the oil remaining in the core after completion of a waterflood operation to essentaiily 100 percent water cut. By constrast, however, the oil recovery test employing a petroleum sulfonate having an average equivalent weight of 50 equivalent weight units less than that which produced the minimum interfacial tension, which is 11.6 percent less than the equivalent weight of petroleum sulfonate which produced the minimum interfaical tension, obtained 87 percent of the tertiary oil remaining in the core after completion of waterflooding. Thus, with all other factors being held constant, including the weight percent concentration of surfactant, the tertiary oil recovery was increased from 49 to 87, which represents a 77.55 percent improvement. Since the cost of petroleum sulfonate is only slightly, if at all, affected by the equivalent weight, it can be appreciated that the economics of the surfactant flooding process employing a petroleum sulfonate having an average equivalent weight of 380 is significantly better than one employing a petroleum sulfonate having an equivalent weight of 430.

The amount of time necessary to obtain the data to construct curve 2 is many times greater than the amount of time necessary to obtain the data from which curve 1 is constructed. Moreover, as samples vary in average equivalent weight as well as in equivalent weight distribution, depending on source feedstock, etc., it is sometimes necessary to vary the blend of petroleum sulfonate material being made in the field as sources of supply change, which would not permit the more time consuming oil recovery measurements necessary to directly measure oil recovery efficiency as a function of varying the blend of petroleum sulfonate and thereby varying the equivalent weight of a mixture.

It should be appreciated too that if the precise equivalent weight corresponding to line 3 which passes through the oil recovery maximum value is not obtained, i.e., if the blend has an average equivalent weight from about 370 to 390, excellent oil recovery efficiencies are still obtained, significantly better in fact than that which would be obtained using the blend which produced the minimum interfacial tension.

By means of the foregoing, it can be appreciated that excellent oil recovery will be obtained under similar conditions by the use of an aqueous solution of petroleum sulfonate having an average equivalent weight not less than about 360 and not greater than about 400, and preferably not less than about 370 and not greater than about 390.

While the foregoing description of the process of our invention has involved numerous specific illustrations, these are presented for purpose of disclosure only and it is not intended that our invention be in any way limited or restricted to these specific illustrations, since many variations thereof will be apparent to persons skilled in the art of oil recovery without departing from the true spirit and scope of our invention. It is our desire that our invention be limited and restricted only by those limitations and restrictions as appear in the claims appended hereinafter below.

We claim:

1. In a method of recovering petroleum from a subterranean, permeable, petroleum-containing formation penetrated by at least one injection well and by at least one spaced-apart production well, both wells being in fluid communication with the petroleum formation, said formation containing water having a salinity from about 2,000 to about 20,000 parts per million total dissolved solids including a concentration of divalent ions comprising calcium and magnesium from about 0 to about 1,000 parts per million, comprising;
    (a) injecting into the formation by the injection well an aqueous saline solution having dissolved therein a petroleum sulfonate whose average equivalent weight is from about 2 to about 20 percent less than the equivalent weight of petroleum sulfonate which produces the minimum interfacial tension between the formation petroleum and water present in the petroleum formation, said surfactant-containing fluid having a salinity from 2,000 to 20,000 parts per million total dissolved solids including from about 0 to about 2,000 parts per million divalent ions, said surfactant fluid displacing petroleum toward the producing well; and
    (b) recovering petroleum displaced by the surfactant fluid from the formation via the producing well.

2. A method as recited in claim 1 wherein the petroleum sulfonate has an equivalent weight from 5 to 15 percent less than the equivalent weight of petroleum sulfonate which produces the minimum interfacial tension between the formation petroleum and formation water.

3. A method of recovering petroleum from a subterranean, petroleum-containing permeable formation penetrated by at least one injection well and by at least one spaced apart production well in fluid communication therewith, said formation containing water having a salinity of from 2,000 to 20,000 parts per million total dissolved solids including from 0 to 1,000 parts per million divalent ions, comprising;
    (a) injecting into the formation by the injection well an aqueous fluid containing a surfactant comprising petroleum sulfonate having an average equivalent weight from 20 to 100 equivalent weight units less than the equivalent weight of the petroleum sulfonate capable of producing the minimum interfacial tension between the formation water and petroleum, said aqueous surfactant fluid having a salinity from 2,000 to 20,000 parts per million total dissolved solids including a divalent ion concentration from about 0 to about 1,000 parts per million, said surfactant fluid displacing petroleum toward the producing well; and
    (b) recovering petroleum displaced by the surfactant fluid from the formation via the producing well.

4. A method as recited in claim 3 wherein the average equivalent weight of the petroleum sulfonate sample is from about 30 to about 70 equivalent weight units less than the equivalent weight of a petroleum sulfonate sample which produces the minimum interfacial tension between the formation petroleum and water present in the formation.

5. A method of recovering petroleum from a subterranean, permeable, petroleum-containing formation containing water whose salinity is from 2,000 to 20,000 parts per million total dissolved solids, penetrated by at least one injection well and by at least one spaced-apart production well, both wells being in fluid communication therewith, comprising;
    (a) obtaining samples of water and petroleum from the subterranean formations;
    (b) obtaining a plurality of samples of petroleum sulfonate having average equivalent weight between about 350 and about 450;
    (c) determining the interfacial tension between the formation petroleum and water from the petroleum formation for each petroleum sulfonate;
    (d) identifying the average equivalent weight of petroleum sulfonate which produced the minimum interfacial tension between formation petroleum and water from the formation petroleum;
    (e) preparing an aqueous fluid containing petroleum sulfonate having an average equivalent weight from about 2 to about 20 percent less than the equivalent weight of petroleum sulfonate which produced the minimum interfacial tension as determined in step (d) above;
    (f) injecting the aqueous surfactant fluid into the formation via the injection well to displace formation petroleum toward the production well; and
    (g) recovering petroleum displaced by the surfactant fluid from the formation via the production well.

6. A method as recited in claim 5 wherein the average equivalent weight of the petroleum sulfonate injected into the formation is from 5 to about 15 percent less than the average equivalent weight of petroleum sulfonate which produced the minimum interfacial tension.

7. A method of recovering petroleum from a subterranean, permeable petroleum-containing formation penetrated by at least one injection well and by at least one spaced apart production well, both wells being in fluid communication therewith, said formation containing water having a salinity of from 2,000 to 20,000 parts per million total dissolved solids including from 0 to 1,000 parts per million divalent ions, comprising;
  (a) obtaining samples of water and petroleum from the subterranean formations;
  (b) obtaining a plurality of samples of petroleum sulfonate having equivalent weight between about 350 and 450;
  (c) determining the interfacial tension between the formation petroleum and water from the petroleum formation for each petroleum sulfonate samples;
  (d) identifying the average equivalent weight of petroleum sulfonate which produced the minimum interfacial tension between formation petroleum and water from the petroleum formation;
  (e) preparing an aqueous fluid containing petroleum sulfonate having an average equivalent weight from about 2 to about 20 percent less than the equivalent weight of petroleum sulfonate which produced the minimum interfacial tension as determined in step (d) above and about the same salinity and divalent ion concentration as the formation water;
  (f) injecting the aqueous surfactant fluid into the formation via the injection well to displace formation petroleum toward the production well; and
  (g) recovering petroleum displaced by the surfactant fluid from the formation via the production well.

8. A method as recited in claim 7 wherein the average equivalent weight of the petroleum sulfonate injected into the formation is from 5 to about 15 percent less than the average equivalent weight of petroleum sulfonate which produced the minimum interfacial tension.

* * * * *